(12) United States Patent
Coscarella

(10) Patent No.: US 8,312,898 B2
(45) Date of Patent: Nov. 20, 2012

(54) PLUG WITH ENGAGEMENT MEMBERS

(76) Inventor: Gabe Coscarella, Edmonton (CA)

( * ) Notice: Subject to any disclaimer, the term of this patent is extended or adjusted under 35 U.S.C. 154(b) by 241 days.

(21) Appl. No.: 12/722,438

(22) Filed: Mar. 11, 2010

(65) Prior Publication Data

US 2010/0229989 A1    Sep. 16, 2010

(30) Foreign Application Priority Data

Mar. 11, 2009 (CA) .................................. 2656933

(51) Int. Cl.
    *F16L 55/11* (2006.01)
(52) U.S. Cl. .............................. 138/89; 138/90; 220/237
(58) Field of Classification Search ................ 138/89, 138/90; 220/237, 251; 137/371
    See application file for complete search history.

(56) References Cited

U.S. PATENT DOCUMENTS

| | | | | | |
|---|---|---|---|---|---|
| 667,333 | A | | 2/1901 | Pflugh | 220/314 |
| 1,047,727 | A | * | 12/1912 | Anschultz | 138/89 |
| 1,409,752 | A | | 3/1922 | Misner | 68/263 R |
| 1,793,394 | A | | 2/1931 | Guenard | 222/556 |
| 2,139,491 | A | * | 12/1938 | Dawson | 126/319 |
| 2,173,999 | A | | 9/1939 | Grundstrom | 220/89.4 |
| 2,218,581 | A | * | 10/1940 | Levan | 220/243 |
| 2,465,727 | A | * | 3/1949 | Jensen | 220/246 |
| 2,512,169 | A | * | 6/1950 | Nachtigal | 138/89 |
| 2,810,401 | A | * | 10/1957 | Stansbury | 138/89 |
| 3,749,131 | A | * | 7/1973 | Burger | 138/89 |
| 4,091,593 | A | * | 5/1978 | Mennuto | 52/783.1 |
| 4,248,271 | A | * | 2/1981 | Burgess | 138/89 |
| 4,461,597 | A | * | 7/1984 | Laurin | 404/25 |
| 4,507,034 | A | | 3/1985 | Lew | 411/21 |
| 4,716,938 | A | | 1/1988 | Weh | 138/93 |
| 4,723,578 | A | | 2/1988 | Mordarski | 138/97 |
| 5,307,841 | A | * | 5/1994 | Condon | 138/90 |
| 5,819,846 | A | | 10/1998 | Bolt, Jr. | 166/123 |
| 6,029,709 | A | * | 2/2000 | Burgess | 138/89 |
| 7,171,987 | B2 | | 2/2007 | Serret | 138/89 |
| 7,325,573 | B2 | | 2/2008 | Coscarella | 138/89 |
| 7,546,847 | B2 | * | 6/2009 | Morrison et al. | 137/317 |
| 2008/0223473 | A1 | * | 9/2008 | Palmer | 138/96 T |

* cited by examiner

*Primary Examiner* — Patrick F Brinson
(74) *Attorney, Agent, or Firm* — Christensen O'Connor Johnson Kindness PLLC

(57) ABSTRACT

A plug has a plug body having an upper face and a lower face and a deformable member having opposed pipe engagement ends. A support structure is carried by the plug body and spaced from the lower face. The support structure supports the opposed pipe engagement ends of the deformable member. An actuator extends outward from the lower face of the plug body and is connected to the deformable member. The actuator adjusts the distance of a central portion of the deformable member from the lower face of the plug body to cause the engagement ends to move between a retracted release position and an extended engagement position. The actuator is actuated from the upper face of the plug body.

15 Claims, 3 Drawing Sheets

PLUG WITH ENGAGEMENT MEMBERS

FIELD

Plugs, such as cleanout plugs for a sewer cleanout, with engagement members.

BACKGROUND

Sewer cleanouts are generally pipes that connect to a sewer system. These pipes are generally closed by attaching a threaded collar to the pipe, and screwing in a plug. If an exterior collar is used, the final height must be determined prior to, for example, a cement floor being installed. If an interior pipe threaded collar is used, this reduces the inner diameter of the cleanout.

SUMMARY

There is provided a plug. The cleanout has a plug body has an upper face and a lower face, and a deformable member having opposed pipe engagement ends. A support structure is carried by the plug body and spaced from the lower face. The support structure supports the opposed pipe engagement ends of the deformable member. An actuator extends outward from the lower face of the plug body and is connected to the deformable member. The actuator adjusts the distance of a central portion of the deformable member from the lower face of the plug body to cause the engagement ends to move between a retracted release position and an extended engagement position. The actuator is actuated from the upper face of the plug body.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
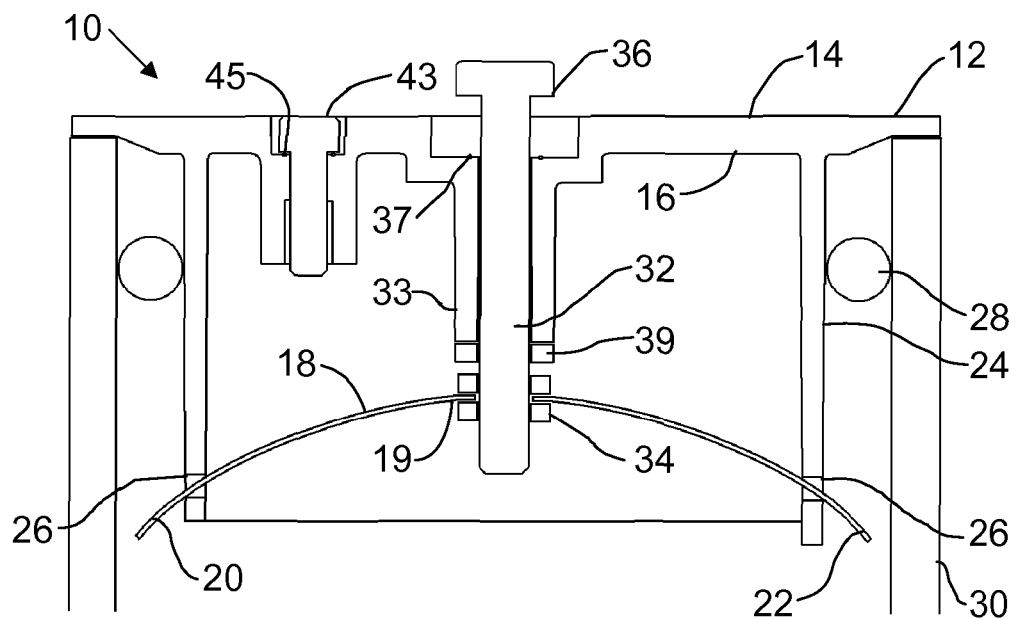
FIG. 1 is a side elevation view in section of a plug.

A plug generally identified by reference numeral 10, will now be described with reference to FIG. 1 through 7.
Structure and Relationship of Parts:

Referring to FIG. 1, plug 10 includes a plug body 12 with an upper face 14 and a lower face 16. A deformable member 18 has opposed pipe engagement ends 20 and 22. A support structure 24 is carried by plug body 12 and is spaced from lower face 16. Support structure 24 supports opposed pipe engagement ends 20 and 22 of deformable member 18. In the depicted embodiment, support structure 24 is a cylindrical wall that depends from lower face 16 with opposed slots 26. Deformable member 18 extends through slots 26. Slots 26 prevent deformable member 18 from rotating, and also allows deformable member 18 to be deformed, as will be described below. As a cylindrical wall, support structure 24 also carries a seal 28 for sealing against the interior of a pipe 30. Seal 28 may be an O-ring seal, a rolling O-ring seal, a gasket, or other seal known to those in the art. Alternatively, seal 28 may be positioned against lower face 16 of plug body 12 to seal against pipe 30.

An actuator 32 extends outward from lower face 16 of plug body 12 and is connected to deformable member 18. Actuator 32 adjusts the position of a central portion of deformable member 18 to cause engagement ends 20 and 22 to move between a retracted release position shown in FIG. 1 and an extended engagement position shown in FIG. 2. Actuator 32 is actuated from upper face 14 of plug body 12. Preferably, actuator 32 is a screw actuator that is manipulated by a wrench or screwdriver, as these are common tools and structures. It will be understood, however, that other actuators that are known to those in the art could be used if desired. As shown, actuator 32 extends through a sleeve 33 that is attached to, or integrally formed with, plug body 12. It will be understood that plug body 12 may also be attached to, or integrally formed with, support structure 24.

Figure 2:
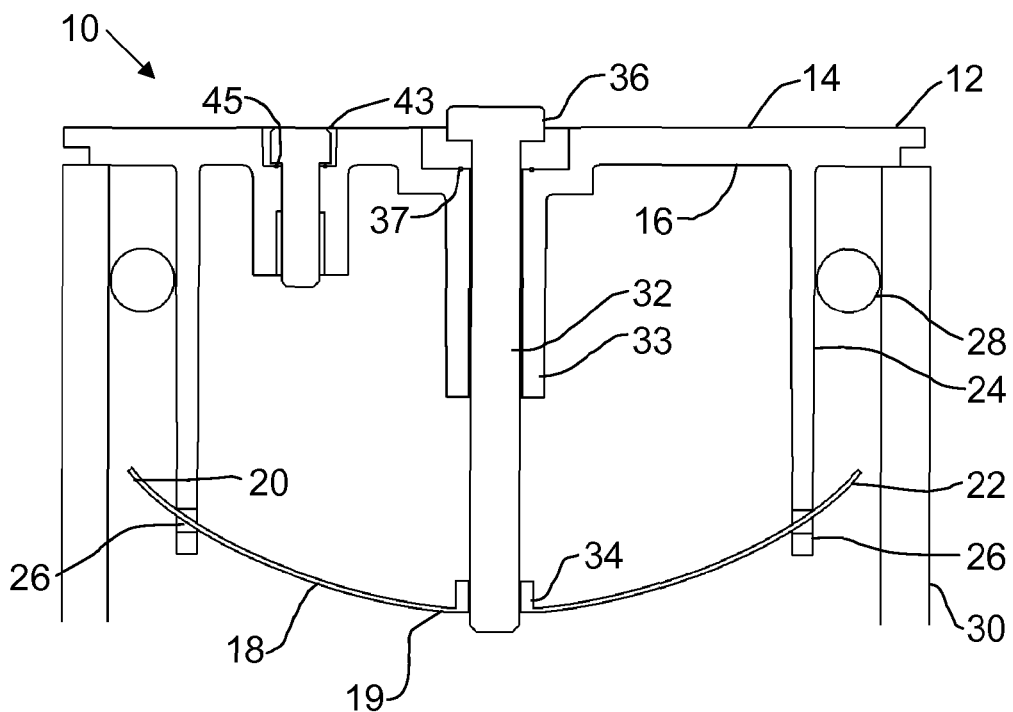
FIG. 2 is a side elevation view in section of an alternative plug.
Figure 3:
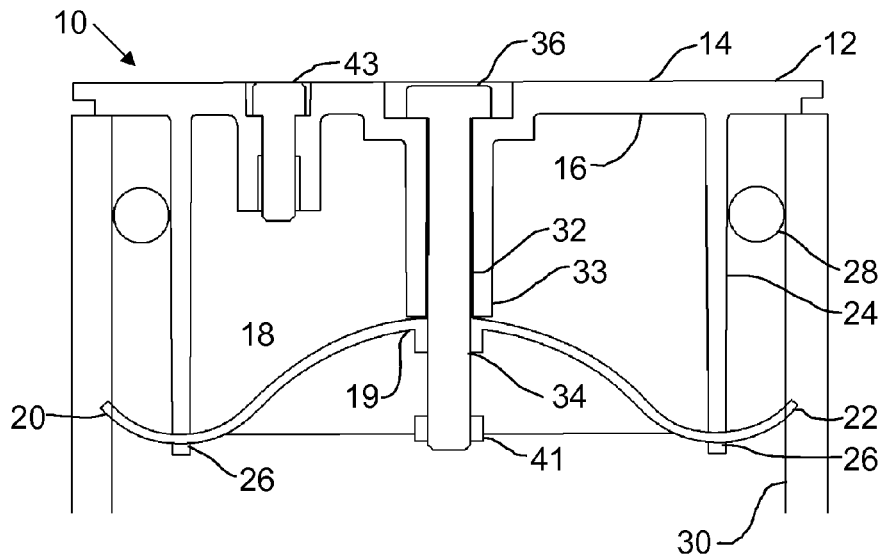
FIG. 3 is a side elevation view in section of a further alternative plug.

In the embodiment shown in FIG. 2, actuator 32 has a threaded travelling member 34 attached to deformable member 18. Actuator 32 includes a screw or bolt head 36 that can be turned to cause travelling member 34 to move up or down. Travelling member 34 is connected to deformable member 18, such as by being integrally formed, welding, or other techniques. As travelling member 34 is drawn toward plug body 12, bolt head 36 is also drawn toward actuator 32 such that bolt head 36 is sealed to body 12 by a seal 37. Tension may be created between bolt head 36 and seal 37 if deformable member 18 is made form, for example, spring steel. Referring to FIG. 1, a nut 39 may be secured to body 12, such that actuator 32 is moved relative to body 12 as it is rotated. Deformable member 18 is carried at a fixed position on actuator 32 between the release and engaged positions. Referring to FIG. 3, if deformable member 18 moves along actuator 32, a stop member 41 may be included to prevent deformable member 18 from moving off actuator 32.

Figure 4:
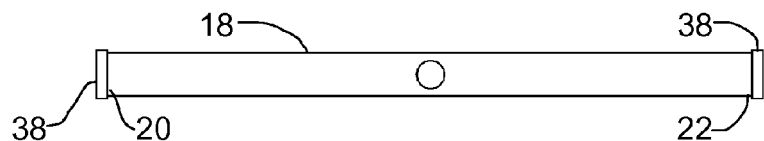
FIG. 4 is a top plan view of a deformable member.
Figure 5:
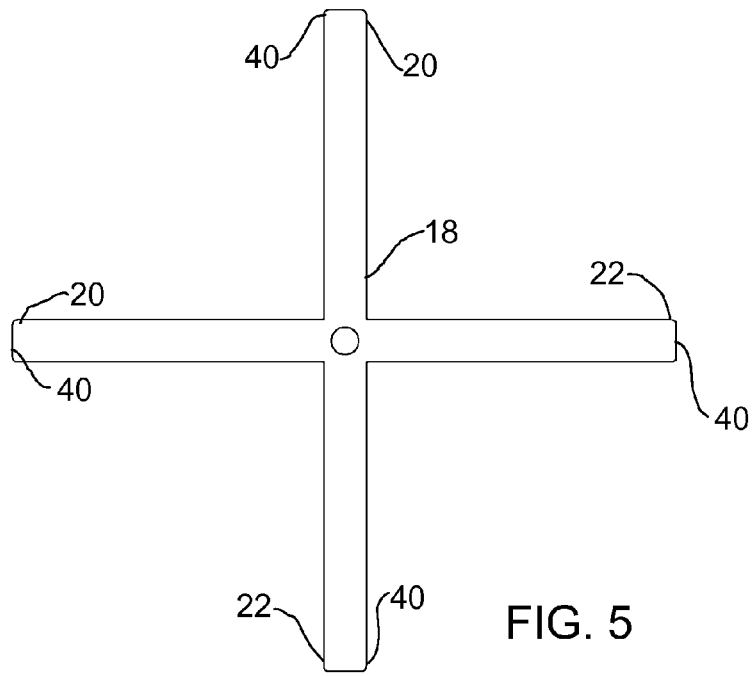
FIG. 5 is a top plan view of an alternative deformable member.

The deformable member 18 may take various forms. Referring to FIG. 1, deformable member 18 may be a bow-shaped piece that curves downward, or upward as shown in FIG. 2. In the example shown in FIG. 1, deformable member 18 is set by causing its central portion 19 to move away from plug body 12, whereas in the example shown in FIG. 2, deformable member 18 is set by causing central portion 19 to move toward plug body 12. This example also has the advantage that slots 26 do not need to have a bottom if deformable member 18 is resilient. Referring to FIG. 3, deformable member 18 may also have a more complex structure. Deformable member 18 may be made from a resilient material, such as spring steel, or it may be a plastically deformable material. This latter option would likely result in a single-use product. Other alternatives will be apparent. For example, deformable member 18 may include substructures, such as hinges, that allow it to be used in the manner prescribed above. Referring to FIG. 4, deformable member 18 may have only two ends 20 and 22, or, referring to FIG. 5, it may have more than two ends, such as four as shown. Referring to FIG. 4, engagement ends 20 and 22 may have a friction member, such as a rubber grommet 38, or referring to FIG. 5, it may be a blade-like member 40 that engages pipe 30 by cutting into it.

Figure 6:
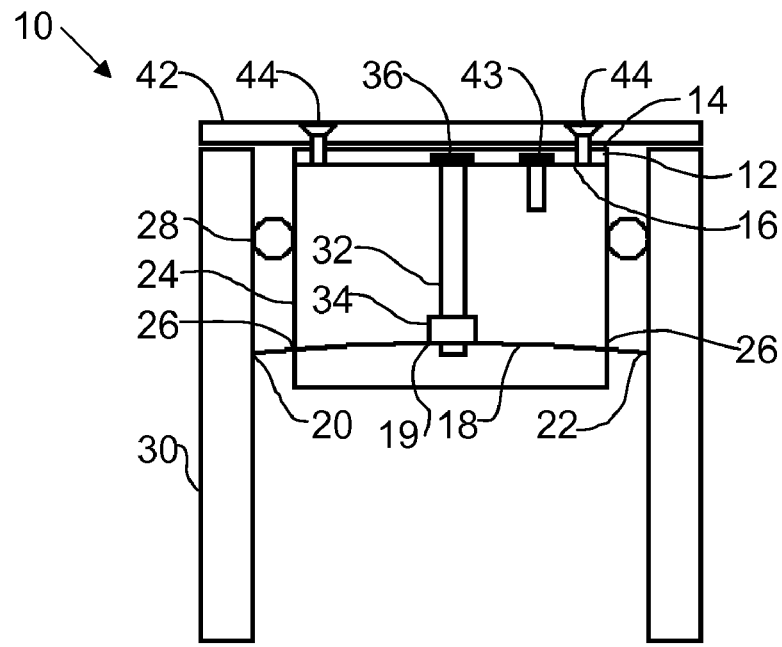
FIG. 6 is a side elevation view in section of a plug with a top plate.
Figure 7:
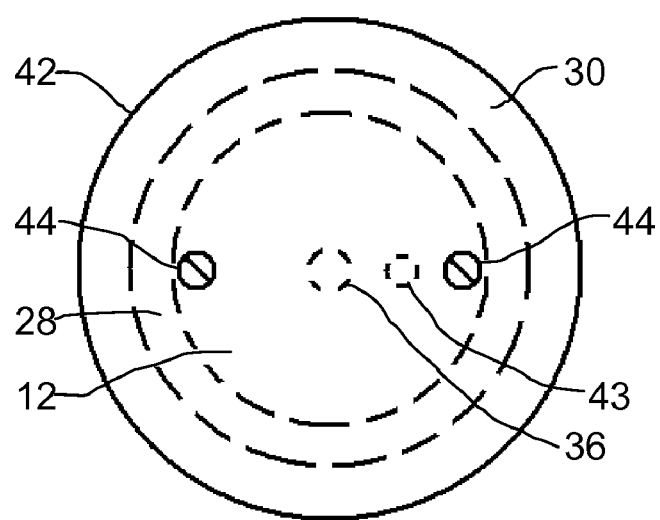
FIG. 7 is a partially transparent top plan view of the plug with a top plate.

Plug 10 may have other features as well. Referring to FIG. 1, plug body 12 may have a pressure release valve 43 that is sealed by a seal 45. Referring to FIGS. 6 and 7, plug 10 may include a plug cover 42 that is removably attached to plug body 12 using screws 44. This would be particularly useful, for example, if plug 10 were being installed in a roadway, where plug cover 42 would be a steel plate, or if it is preferred to hide plug 10. While the previous examples have the diameter of plug body 12 sufficient to cover pipe 30, in this example plug body 12 may have a smaller diameter than pipe 30 while plug cover 42 is the same diameter, or greater, to properly cover pipe 30.

Operation:

Referring to FIG. 1, plug 10 is inserted into a pipe 30 to be sealed. This may be a sewer cleanout, for example, in which case it may be embedded in a cement floor. It may be necessary to trim pipe 30, particularly when embedded in a cement floor. Plug 10 is inserted until plug body 12 rests on top of pipe 30, or, if a cover plate 42 is used, as shown in FIG. 6, until top face 14 of plug body 12 is flush with the top of pipe 30. In some embodiments, the outer edge of plug body 12 may be tapered, in which case it may be desireable to cut a corresponding taper in pipe 30 (not shown) In the depicted embodiment, as plug 10 is inserted, O-ring seal 28 rools up support structure 24, and provides a seal between support structure 24 and pipe 30.

As plug 10 is inserted, deformable member 18 is in a retracted, release position. This release may take many forms, such as those shown, or others that will be apparent to those skilled in the art once the principles are understood. Once plug 10 is positioned as desired, actuator 32 is actuated, such as by rotating bolt or screw head 36 if actuator 32 is a screw actuator. As actuator 32 rotates, threaded travelling member 34 is prevented from rotating, such that it travels up or down actuator 32, such that deformable member 18 is adjusted to an extended, engaging position, as shown in FIG. 6. As discussed above, deformable member may be curved upward, downward, or other shapes. As depicted, threaded travelling member 34 is held stationary by its attachment to deformable member 18, which is prevented from rotating by support structure 24. Support structure has slots 26 through which deformable member 18 extends. Slots 26 prevent deformable member 18 from rotating, and also allows deformable member 18 to slide through support structure 24 as its shape is changed, while allowing central portion 19 to move relative to ends 20 and 22. It will be apparent that there will be some movement of ends 20 and 22 toward or away from plug body 12 as central portion 19 is moved, however in the depicted embodiment, this will be less than central portion 19. In some embodiments, it may not be a slot, it may be a notch from the bottom, for example if deformable member 18 is made from spring steel and is curved upward, since no support is required below deformable member 18. As ends 20 and 22 extend outward, they engage pipe 30, either by friction, or by cutting into the inner wall. In either event, plug 10 is then secured in pipe 30. If cover plate 42 is used, it is then attached to plug body 12 using screws 44.

When it is desired to remove plug 10, cover 42 is removed if necessary, and pressure release valve 43 may be opened to release any pressure that may have built up. Actuator 32 is then actuated in the opposite direction to move central portion 19 of deformable member 18 and cause deformable member 18 to return to the retracted, release position. Plug 10 may then be removed from pipe 30.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A plug, comprising:
   a plug body having an upper face and a lower face;
   a deformable member having opposed pipe engagement ends;
   a support structure carried by the plug body and spaced from the lower face, the support structure supporting the opposed pipe engagement ends of the deformable member;
   an actuator extending outward from the lower face of the plug body and being connected to the deformable member, the actuator adjusting the distance of a central portion of the deformable member from the lower face of the plug body to cause the engagement ends to move between a retracted release position and an extended engagement position, the actuator being actuated from the upper face of the plug body.

2. The plug of claim 1, wherein the actuator is a screw actuator having a threaded travelling member attached to the deformable member.

3. The plug of claim 2, wherein the travelling member is integrally formed with the deformable member.

4. The plug body of claim 1, wherein the actuator moves relative to the plug body, and the deformable member is carried by the actuator.

5. The plug of claim 1, wherein the deformable member is resilient.

6. The plug of claim 1, wherein the retracted release position is arrived at by moving the central portion of the deformable member toward or away from the plug body.

7. The plug of claim 1, wherein the support structure depends from the lower face, the deformable member extending through opposed slots in the support structure.

8. The plug of claim 7, wherein the support structure further supports a seal for sealing against an interior of a pipe.

9. The plug of claim 1, wherein the engagement ends comprise a friction member for engaging the pipe.

10. The plug of claim 1, wherein the engagement ends comprise a blade member for engaging the pipe.

11. The plug of claim 1, wherein the plug body comprises a pressure release valve.

12. A plug, comprising:
    a plug body having an upper face and a lower face;
    a deformable member having opposed pipe engagement ends;
    a support structure carried by the plug body and spaced from the lower face, the support structure supporting the opposed pipe engagement ends of the deformable member;
    an actuator extending outward from the lower face of the plug body and being connected to the deformable member, the actuator adjusting the distance of a central portion of the deformable member from the lower face of the plug body to cause the engagement ends to move between a retracted release position and an extended engagement position, the actuator being actuated from the upper face of the plug body; and a plug cover removably attached to the plug body.

13. The plug of claim 12, wherein the plug body has a smaller diameter than a pipe to be sealed, and the plug cover has a diameter equal to or greater than the diameter of the pipe to be sealed.

14. The plug of claim 12, wherein the deformable member comprises two or more pipe engagement ends.

15. The plug of claim 12, wherein the deformable member is resilient.

* * * * *